United States Patent [19]

Kokaku et al.

[11] Patent Number: 4,713,288
[45] Date of Patent: Dec. 15, 1987

[54] MAGNETIC RECORDING MEDIUM

[75] Inventors: Yuuichi Kokaku; Makoto Kitoh; Yoshinori Honda, all of Yokohama, Japan

[73] Assignee: Hitachi, Ltd., Tokyo, Japan

[21] Appl. No.: 910,141

[22] Filed: Jun. 4, 1986

[30] Foreign Application Priority Data

Jun. 17, 1985 [JP] Japan .................................. 60-129820

[51] Int. Cl.$^4$ .............................................. G11B 5/72
[52] U.S. Cl. .................................. 428/336; 427/128;
427/131; 427/41; 204/192.22; 204/192.16;
204/192.14; 428/408; 428/457; 428/480;
428/473.5; 428/694; 428/695; 428/900
[58] Field of Search ............... 428/695, 408, 694, 900,
428/336, 480, 473.5, 457; 427/131, 128, 44, 41;
360/134–136; 204/192 M, 192.22, 192.16, 192.14

[56] References Cited

U.S. PATENT DOCUMENTS

| | | | |
|---|---|---|---|
| 4,241,139 | 12/1980 | Kubota | 428/423.1 |
| 4,390,562 | 6/1983 | Yanagisawa | 427/131 |
| 4,390,601 | 6/1983 | Ono | 428/900 |
| 4,411,963 | 10/1983 | Aine | 427/132 |
| 4,503,125 | 3/1985 | Nelson | 427/132 |
| 4,514,451 | 4/1985 | Suzuki | 428/141 |
| 4,521,482 | 6/1985 | Arai | 427/41 |
| 4,601,950 | 7/1986 | Iida | 427/131 |

FOREIGN PATENT DOCUMENTS 0207431  11/1984  Japan .................................. 428/695

Primary Examiner—Ellis P. Robinson
Attorney, Agent, or Firm—Antonelli, Terry & Wands

[57] ABSTRACT

Disclosed is a magnetic recording medium in which a magnetic layer of a ferromagnetic material, a layer of an organic material and a layer of carbon are formed on a substrate in this order.

The magnetic recording medium has the benefit of remarkably extended life time because peeling and removing of the carbon protective layer can be prevented so that carbon can exerts its own lubricating action during the sliding contact of the magnetic recording medium with a magnetic head.

22 Claims, No Drawings

MAGNETIC RECORDING MEDIUM

BACKGROUND OF THE INVENTION a. Field of the Invention

This invention relates to a thin-film high recording density magnetic recording medium having a magnetic layer formed by sputtering, vapor deposition or vacuum evaporation, or plating, and, more particularly, to a magnetic recording medium wherein a protective layer resistant to sliding friction with magnetic heads is formed to extend the life thereof.

b. Prior Arts

For magnetic recording media such as magnetic disk or magnetic tape, it is important to reduce the problem of abrasion of the medium due to the sliding motion between a magnetic head and the medium. Especially, a thin-film magnetic recording medium in which a magnetic layer is directly formed by sputtering, vapor deposition or vacuum evaporation, or plating does not allow for the step of mixing a lubricant into a binder as opposed to conventional media wherein a magnetic layer is formed by dispersing ferromagnetic powder in a binder and coating the composition followed by drying. For this reason, the problem is more difficult to solve in the former case.

In order to improve the resistance of the thin-film magnetic recording medium to abrasion and wear due to sliding friction, it is desirable to provide a lubricating protective layer on the surface of the magnetic layer. There have been proposed various methods for forming a lubricating protective layer. These methods are, for example, by coating a liquid lubricating oil, sputtering an organic polymer to form a thin film (Japanese Patent Application Kokai No. 57-116771), polymerizing a fluoro organic compound or an organic silicon compound in a plasma for deposition (Japanese Patent Application Kokai No. 51-127702), vacuum depositing a higher fatty acid (Japanese Patent Application Kokai No. 54-11303), and sputtering carbon to form a thin film (Tago et al., The 8th Applied Magnetism Society of Japan's Scientific Conference Papers, p. 222, Nov., 1984). The present inventors have followed these methods to find that the life of the resultant media is extended as compared with protective layer-free media, but not to a sufficient extent for actual use. However, it has been found that sputtered carbon films have a low coefficient of abrasion and are difficult to wear out. The sputtered carbon films, however, are not fully effective as such because they weakly adhere to the magnetic layer and are readily peeled off by the sliding friction.

SUMMARY OF THE INVENTION

It is an object of the present invention to provide a magnetic recording medium having a protective layer which is less abraded away under the sliding friction with a magnetic head and thus exhibiting a remarkably extended duration of life.

According to the present invention, to intermediate layer is provided between a carbon layer and a magnetic layer to increase the adherence of the carbon layer. As the intermediate layer functions to prevent peeling of the carbon layer, there is obtained a magnetic recording medium having high resistance against sliding friction.

The inventors have found that it is effective to use an organic material for the intermediate layer. This is because the organic material layer has high affinity to the sputtered carbon layer, and probably because the sputtering energy causes some linkages of the organic material at the surface to be broken and new linkages are formed between the organic material layer and the carbon layer by reaction of the organic material with the sputtered carbon particles, enhancing the adhesion of the carbon layer.

The formation of the carbon layer, according to the present invention, is preferably carried out under such conditions that electron, ion and/or neutral particles having sufficient energy to break the linkage of the organic material at the surface thereof may impinge on the surface to be treated at the early stage of layer formation. For example, in DC sputtering, high-frequency sputtering, magnetron sputtering or ion beam sputtering, the carbon layer can be formed using a carbonaceous material as a target. Preferably, the magnetron sputtering method may be used because of high speed carbon layer formation. Other useful methods include ionization deposition as disclosed by Mori et al., "Surface Science," Vol. 3, No. 2, p. 75, 1982, plasma CVD in which hydrocarbon, gas is decomposed in a plasma so as to deposit a hard carbon film, or ion beam-combined vacuum deposition in which vapor deposition is carried out while applying an ion beam to the substrate to be treated. Among these, the plasma CVD is preferred because of its high speed carbon formation.

The organic materials used for the organic material layer of the present invention should be formed into a film as thin as 0.5 $\mu$m or less, preferably 0.1 to 0.001 $\mu$m. If the adhesion between the organic material layer and the substrate to be treated is low, peeling will occur at this interface. The organic material is thus desired to have a bond strength of 10 Kg/cm$^2$ or more, preferably 50 Kg/cm$^2$ more as evaluated by the bond strength test of JIS K6849.

The methods for forming the organic material layer and the materials used therefor are described below:

(i) Coating Method

An organic polymeric material can be dissolved in a solvent to form a solution from which a coating is prepared by spin coating, pulling wherein a substrate to be treated is dipped in the solution and then pulled up, or spraying wherein the solution is sprayed and dried, followed by evaporation of the solvent. The organic polymeric materials which can be used in these methods are those materials which are soluble in a solvent having a boiling point of 50° to 250° C. at a concentration of 0.1% by volume or more. The preferred organic polymeric materials include thermoplastic polymers such as polystyrene, polyvinyl acetate, acrylic resins, methacrylate resins, polyamide, thermoplastic polyurethane, polyimide, polyamide imide, polyester imide, and polybenzimidazole; and low-molecular-weight materials before curing into thermoset resins such as phenolic resins, furan resins, urea resins, melamine resins, unsaturated polyester resins, and epoxy resins. These organic polymeric materials may be used alone or as a mixture thereof. The solutions of the organic polymers may be prepared to a concentration of 0.1 to 50% by volume, preferably 0.1 to 10% by volume, applied by any of the foregoing coating methods, and then dried by heating to a temperature higher than the boiling point of the solvent.

(ii) Sputtering

The organic polymeric compound can be subjected to sputtering with this comound used as a target, to form a thin film of the organic material on the substrate to be treated. The sputtering apparatus used includes a cathode electrode placed in a vessel which may be evacuated into vacuum. A plate of the organic polymer or a plate of any given material having the organic polymer coated on the surface thereof is disposed so as to cover the cathode surface. A gas composed mainly of Ar, He, Ne, Kr or Xe is introduced into the vessel to establish a pressure in the range of from 0.001 to 0.1 Torr, then a high voltage is applied to the cathode electrode to create an electrical discharge. Using the energy of ions generated by the electrical discharge, the organic polymer is sputtered to form a film onto the surface of the substrate to be treated which is opposed to the cathode. The high voltage to be applied may be either a negative DC voltage or a high-frequency voltage having a frequency of from 10 KHz to 100 MHz. However, the use of the high-frequency voltage allows the film to be formed with better reproducibility. The organic polymer used as a target is selected from organic polymers having a melting point or heat decomposition point of 100° C. or higher so as to withstand a high temperature during the sputtering. The organic polymers employed include thermosetting resins such as phenol resins, furan resins, urea resins, melamine resins, unsaturated polyester resins, and epoxy resins as well as aromatic polyamides, polyphenylene, polyimides, polyamide imides, polyester imides, polybenzimidazole, polyphenylene oxide, and silicone resins.

(iii) Plasma Polymerization

The vapor of the organic compound can be activated in a plasma to form a thin film of the organic material onto the surface of the substrate to be treated. A given organic compound which may be evaporated into a gas is employable in this plasma polymerization method. However, if the vapor pressure is extremely low, the polymerization rate is undesirably low. Therefore, an organic compound which can develop, at room temperature, 0.05 Torr or more in terms of saturated vapor pressure is preferred. The organic compounds employable in this method include hydrocarbons represented by a general formula $C_nH_m$ (n is an integer of 7 or less), such as methane, ethane, propane, ethylene, propylene, acetylene, benzene, styrene, and toluene; halogenated hydrocarbons such as monochloroethane, monochloroethylene, 1,2-dichloroethylene, chlorobenzene, ethylene iodide, and ethylene bromide; ketones such as methyl ethyl ketone, diethyl ketone, methyl vinyl ketone, and methyl isopropenyl ketone; esters such as methyl acrylate, methyl methacrylate, vinyl acrylate, and vinyl methacrylate; fluorohydrocarbons such as tetrafluoroethylene, perfluorocyclobutane, and perfluorobenzene; and silicon-containing organic compounds such as tetramethyl silane, hexamethyl disilazine, tetravinyl silane, and tetramethyl disilaxane. However, the organic compounds employable in this method are not limited to those as mentioned above. These organic compounds may be used alone or as a mixture thereof. Among these, silicone-containing organic compounds are preferably employed because of their high bonding strength between said compounds and magnetic layer.

An apparatus used for the plasma polymerization comprises a vessel capable of being evacuated to vacuum, an evacuating device, a device for introducing the organic compound vapor and a plasma producing arrangement. The method for generating a plasma may be of an inner electrode type wherein an electrode is provided within the vessel and a DC, AC or high-frequency voltage is applied to the electrode, of an external electrode type or an externally introducing type in which an electric field or a magnetic field is produced by an electrode or a coil provided outside of the vessel, or of a microwave type which uses a microwave. Among these types of plasma producing methods, the inner electrode type using a DC or AC voltage has the disadvantage that the organic material is liable to adhere to the electrode, possibly causing the plasma to be unstable. For this reason, plasma producing methods other than the inner electrode type are preferred.

As a reacting gas, the organic compound vapor may be used alone or in combination with rare gas or $H_2$, $N_2$, or $O_2$. The internal pressure of the reactor vessel is preferably in a range of from 0.1 to 10 Torr. It is preferred that the above-mentioned reacting gas is introduced, at a constant rate of flow, into the reactor vessel and the evacuating rate is controlled to obtain a desired gas pressure. After control of the gas pressure, the plasma is produced in the method as mentioned above and the organic material layer is formed on the surface of the substrate to be treated which is disposed within the vessel.

(iv) Vapor Deposition

The organic compound can be heated within a vaccum vessel to evaporate the same to deposit the resultant organic material vapor molecule onto the surface of the substrate to be treated which is disposed at an opposite position, to form a layer of the organic material. Organic compounds employable include higher fatty acids such as palmitic acid, stearic acid, oleic acid, linoleic acid, and linolenic acid; and a lithium salt, sodium salt, potassium salt thereof. The heating may be effected by electric resistance or by electron radiation.

The magnetic layer of the present invention has a ferromagnetic material formed in a thin film by sputtering, vapor deposition or plating. The material of the magnetic layer is, for example, $\gamma$-$Fe_2O_3$, Co, a Co-Ni alloy, a Co-Cr alloy, a chrome oxide, a Fe-Co-Cr alloy, a Co-P alloy, a Co-Ni-P alloy or the like. As the substrate on which the magnetic layer is formed, there may be used polyester film or a polyimide film in the case of a magnetic tape or floppy magnetic disk. and an aluminum substrate which is hardened, at the surface portion thereof, by anodization or formed with a hard plated layer of Ni-P in the case of a magnetic disk.

DETAILED DESCRIPTION OF THE PREFERRED EMBODIMENTS

Examples of the present invention will now be described together with comparative examples.

EXAMPLE 1

An aluminum disk substrate was anodized on the surface thereof and Fe was sputtered on either side of the substrate in an atmosphere of argon containing oxygen. Thereafter, the substrate was subjected to thermal oxidation at 300° C. to form a magnetic layer of $\gamma$-$Fe_2O_3$. The thickness of the $\gamma$-$Fe_2O_3$ layer was 0.2 $\mu$m. Using an organic polymer compound as shown in Table 1 under conditions as also shown in Table 1, sputtering was carried out on the opposite sides of the substrate to form an organic material layer of 0.02 $\mu$m in thickness. For the sputtering, a parallel electrode high-frequency sputtering apparatus was employed and the power source frequency was 13.56 MHz. Subsequently, sputtering was carried out on the opposite sides of the substrate by means of the parallel electrode high-frequency sputtering apparatus with graphite carbon used as a target, forming a carbon layer having a thickness of 0.02 μm.

An actual magnetic head was in contact with the surface of the thus prepared magnetic disk and the disk was rotated at 3000 rpm to cause the head to float. Then, the rotation was halted to bring the head again into contact with the disk. This cycle was repeated to conduct a life test (contact-start/stop test: hereinafter referred to as CS/S test). The number of cycles (CS/S cycles) the disk underwent until the disk surface flawed was used as an index of life time. The results became are shown in Table 1. It is evident that the life time is extended as compared with the disk where no protective layer is provided on the magnetic layer or the disk where no organic material layer is provided.

COMPARATIVE EXAMPLE 1

A CS/S test was conducted on a disk substrate having a magnetic layer formed as in Example 1, but free of a protective layer, to evaluate the life thereof. The results are shown in Table 1 which reveal that the magnetic layer got flawed after least cycles and the life was short.

COMPARATIVE EXAMPLE 2

A CS/S test was conducted on a disc substrate provided with a magnetic layer as in Example 1 and formed with a carbon layer by sputtering without forming an organic layer, to evaluate the life thereof. As shown in Table 1, the results were such that the carbon layer was peeled off and the life was short.

TABLE 1

| Sample No. | Interm. layer target mat. | Interm. layer sput. condit. | | Carbon sput. condit. | | CS/S cycle (K cycles) |
|---|---|---|---|---|---|---|
| | | Atmos. gas pressure (Ar) | Sput. power | Atmos. gas pressure (Ar) | Sput. power | |
| Example 1 | | | | | | |
| 1 | polyimide | 0.01 Torr | 500 W | 0.01 Torr | 1000 W | 15 |
| 2 | resin | 0.01 Torr | 500 W | 0.005 Torr | 1000 W | 20 |
| 3 | phenol | 0.005 Torr | 500 W | 0.01 Torr | 1000 W | 18 |
| 4 | resin | 0.005 Torr | 500 W | 0.005 Torr | 1000 W | 25 |
| 5 | epoxy | 0.003 Torr | 500 W | 0.01 Torr | 1000 W | 10 |
| 6 | resin | 0.003 Torr | 500 W | 0.005 Torr | 1000 W | 22 |
| 7 | polyamide | 0.02 Torr | 500 W | 0.005 Torr | 1000 W | 19 |
| 8 | resin | 0.02 Torr | 500 W | 0.005 Torr | 1000 W | 17 |
| Comparative Exam. 1 | — | — | — | — | 0.01 | |
| Comparative Exam. 2 | — | — | 0.01 Torr | 1000 W | 0.5 | |

EXAMPLE 2

On either side of a magnetic disk substrate formed with magnetic layers in substantially the same manner as in Example 1, an organic polymeric compound in a solvent as shown in Table 2 was applied by spin coating to form an organic material layer of 0.03 μm in thickness. Then, carbon sputtering was carried out on either side of the substrate as in Example 1 to form a carbon layer of 0.02 μm in thickness. The magnetic disk thus prepared was evaluated in a CS/S test machine. The results are shown in Table 2. As in Example 1, satisfactory results were obtained.

TABLE 2

| Sample No. | Intermed. layer material | Solvent | Carbon sput. condit. | | CS/S cycle (K cycles) |
|---|---|---|---|---|---|
| | | | Atmos. gas pressure (Ar) | Sput. power | |
| Example 2 | | | | | |
| 9 | polyimide | N—methylpyrrolido | 0.01 Torr | 1000 W | 10 |
| 10 | resin | " | 0.005 Torr | 1000 W | 12 |
| 11 | phenol | methyl ethyl ketone | 0.01 Torr | 1000 W | 8 |
| 12 | resin | " | 0.005 Torr | 1000 W | 14 |
| 13 | epoxy | methyl ethyl ketone | 0.01 Torr | 1000 W | 10 |
| 14 | resin | " | 0.005 Torr | 1000 W | 19 |

EXAMPLE 3

A magnetic disk substrate with a magnetic layer formed in substantially the same manner as in Example 1 was placed on one of parallel electrodes in a vacuum vessel. The vessel is filled with the vapor of an organic compound as shown in Table 3 and a high-frequency voltage of 13.56 MHz was applied across the electrodes to produce a plasma to polymerize the organic compound, thereby forming organic material layers each having a thickness of 0.02 μm on the opposite sides of the substrate. Then, the opposite sides of the substrate were subjected to carbon sputtering as in Example 1 to form carbon layers of 0.03 μm in thickness. The thus prepared magnetic disk was subjected to a test by a CS/S test machine. The results are shown in Table 3. As in the foregoing Examples 1 and 2, satisfactory results were obtained.

TABLE 3

| Sample No. | Intermed. layer mater. (momomer) | Plasma polymer. condit. | | Carbon sput. condit. | | CS/S cycle (K cycles) |
|---|---|---|---|---|---|---|
| | | Monomer gas pres. | Polymr. power | Atmos. gas pressure | Sput. power | |
| Example 3 | | | | | | |
| 15 | styrene | 0.1 Torr | 100 W | 0.01 Torr | 1000 W | 9 |
| 16 | methyl | 0.2 Torr | 100 W | " | " | 12 |

TABLE 3-continued

| Sample No. | Intermed. layer mater. (momomer) | Plasma polymer. condit. | | Carbon sput. condit. | | CS/S cycle (K cycles) |
|---|---|---|---|---|---|---|
| | | Monomer gas pres. | Polymr. power | Atmos. gas pressure | Sput. power | |
| 17 | methacrylate hexamethyl disilazine | 0.05 Torr | 200 W | " | " | 15 |
| 18 | tetramethyl silane | 0.05 Torr | 200 W | " | " | 17 |
| 19 | ethylene | 0.1 Torr | 150 W | " | " | 10 |

EXAMPLE 4

A Co-Ni alloy is vacuum deposited 0.1 μm thick on the surfaces of a polyester film of 10 μm thick by oblique deposition to form magnetic layers. Then, the surfaces of the magnetic layers are subjected to sputtering by using an organic polymer as shown in Table 4 as a target in substantially the same manner as in Example 1 to form organic material layers of 0.01 μm thick. Subsequently, the target was changed to graphite and similar sputtering was carried out to form carbon layers of 0.02 μm thick.

The thus obtained vacuum evaporated tape was subjected to a test by a pin sliding test machine. Around a guide pin which is commonly used in an actual video tape recorder, the tape was wound at a wrapping angle of 90°, such that the magnetic material side of the tape may contact with the pin. The tape was moved in sliding contact at a speed of 1m/min under a load of 20 g. The flaw-occurring state on the tape surface and the degree of peeling of the protective film after 100 cycles of sliding motion were examined. From the results shown in Table 4, no peeling of the protective film was observed and no flaw reaching to the magnetic layer was seen.

COMPARATIVE EXAMPLE 3

A tape having a magnetic layer vacuum evaporated in substantially the same manner as in Example 4 was subjected, without further processing, to a test by the pin sliding test machine. The results are shown in Table 4 which indicate that a number of flaws were formed on the surface of the magnetic layer.

COMPARATIVE EXAMPLE 4

On a vacuum evaporated magnetic layer of a tape which was formed identically with Example 4, a carbon layer is formed by sputtering without providing an organic material layer. The prepared tape was evaluated in a test using the pin sliding test machine. The results as shown in Table 4 reveal that the protective layer was peeled and flaws were formed even in the magnetic layer.

TABLE 4

| Sample No. | Interm. layer target mater. | Interm. layer sput. condit. | | Carbon sput. condit. | | Peel. of protec. layer | Peel. of magnet. layer |
|---|---|---|---|---|---|---|---|
| | | Atmos. gas pres. (Ar) | Sput. power | Atmos. gas pres. (Ar) | Sput. power | | |
| Example 4 | | | | | | | |
| 20 | polyimide | 0.01 Torr | 500 W | 0.01 Torr | 1000 W | none | none |
| 21 | resin | 0.01 Torr | 500 W | 0.005 Torr | 1000 W | none | none |
| 22 | phenol | 0.005 Torr | 500 W | 0.01 Torr | 1000 W | none | none |
| 23 | resin | 0.005 Torr | 500 W | 0.005 Torr | 1000 W | none | none |
| 24 | epoxy | 0.003 Torr | 500 W | 0.01 Torr | 1000 W | none | none |
| 25 | resin | 0.003 Torr | 500 W | 0.005 Torr | 1000 W | none | none |
| 26 | polyamide | 0.02 Torr | 500 W | 0.01 Torr | 1000 W | none | none |
| 27 | resin | 0.02 Torr | 500 W | 0.005 Torr | 1000 W | none | none |
| Comparative Exam. 3 | — | — | — | — | — | — | much |
| Comparative Exam. 4 | — | — | — | 0.01 Torr | 1000 W | much | some |

EXAMPLE 5

An aluminum disk substrate provided with a $\gamma\text{-Fe}_2\text{O}_3$ magnetic layer as in Example 1 was set on a substrate holder of a resistance heating type vacuum evaporation apparatus. Stearic acid was charged in an evaporating material container and the vacuum evaporation chamber was purged to $1 \times 10^{-8}$ Torr or less. Then the vessel was heated to generate the vapor of stearic acid to deposit an evaporated film of 0.005 μm thick on the surface of the $\gamma\text{-Fe}_2\text{O}_3$ magnetic layer. Thereafter, this disk substrate was opposed to a target electrode of a parallel electrode sputtering apparatus and sputtering of carbon was carried out under the same conditions as in Example 1. The thickness of the carbon layer was 0.02 μm. The thus prepared magnetic disk was tested by a CS/S test machine as in Example 1. The CS/S cycles reached 20K times and the duration of life of the disk was extended 40 times as compared with the disk where the stearic acid evaporated film was not provided.

As described above, the magnetic recording medium according to the present invention has the benefit of remarkably extended life time because peeling and removing of the carbon protective layer can be prevented so that carbon can exert its own lubricating action during the sliding contact of the magnetic recording medium with a magnetic head.

We claim:

1. A magnetic recording medium comprising a magnetic layer of a ferromagnetic material, a layer of an organic material and a layer of carbon on a substrate in this order, wherein said layer of an organic material has a thickness of 0.001 to 0.5 μm and a bond strength of at least 10 Kg/cm².

2. A magnetic recording medium as claimed in claim 1, wherein said layer of an organic material is formed by sputtering an organic polymeric material with high-energy ions.

3. A magnetic recording medium as claimed in claim 1, wherein said layer of an organic material is formed by coating a solution of the organic material in a solvent onto the magnetic layer and then evaporating the solvent to dry the coating.

4. A magnetic recording medium as claimed in claim 1, wherein said layer of an organic material is formed by reacting a volatile organic compound vapor in a plasma to produce an organic polymeric material.

5. A magnetic recording medium as claimed in claim 1, wherein said layer of an organic material is formed by vacuum depositing a higher fatty acid or an alkali salt thereof.

6. A magnetic recording medium as claimed in any one of claims 1 to 5, wherein said layer of an organic material has a thickness of 0.001 to 0.1 $\mu$m.

7. A magnetic recording medium as claimed in any one of claims 2 to 5, wherein said layer of carbon is formed by any one method of sputtering a target material comprised of carbon; decomposing a hydrocarbon-containing gas in a plasma for deposition; ionization deposition wherein carbon is evaporated in a vacuum vessel and the resultant vapor particles are ionized and accelerated in an electric field to impinge on the surface of the substrate to be treated; or evaporating carbon while irradiating the surface of the substrate to be treated with an energy beam such as an ion beam, laser, and electron rays.

8. A magnetic recording medium as claimed in claim 1, wherein said layer of an organic material has a bond strength of at least 50 Kg/cm$^2$.

9. A magnetic recording medium as claimed in claim 1, wherein said ferromagnetic material is selected from the group consisting of $\alpha$-Fe$_2$O$_3$, Co, a Co-Ni alloy, a Co-Cr alloy, a chrome oxide, a Fe-Co-Cr alloy, a Co-P alloy and a Co-Ni-P alloy.

10. A magnetic recording medium as claimed in claim 1, wherein said substrate is a polyester film or a polyimide film.

11. A magnetic recording medium as claimed in claim 1, wherein said substrate is an aluminum substrate having a hardened surface portion.

12. A magnetic recording medium as claimed in claim 2, wherein said organic material is selected from the group consisting of phenol resins, furan resins, urea resins, melamine resins, unsaturated polyester resins, epoxy resins, aromatic polyamides, polyphenylene, polyimides, polyamide imides, polyester imides, polybenzimidazole, polyphenylene oxide and silicone resins.

13. A magnetic recording medium as claimed in claim 3, wherein said organic material is at least one member selected from the group consisting of polystyrene, polyvinyl acetate, acrylic resins, methacrylate resins, polyamide, thermoplastic polyurethane, polyimide, polyamide imide, polybenzimidazole, phenolic resins, furan resins, urea resins, melamine resins, unsaturated polyester resins and epoxy resins.

14. A magnetic recording medium as claimed in claim 4, wherein said organic material is at least one member selected from the group consisting of hydrocarbons represented by the general formula C$_n$H$_m$ where n is an integer of 7 or less, halogenated hydrocarbons, ketones, esters, fluorohydrocarbons and silicon-containing organic compounds.

15. A magnetic recording medium as claimed in claim 14, wherein said hydrocarbons represented by the general formula C$_n$H$_m$ where n is an integer of 7 or less are selected from the group consisting of methane, ethane, propane, ethylene, propylene, acetylene, benzene, styrene and toluene.

16. A magnetic recording medium as claimed in claim 14, wherein said halogenated hydrocarbons are selected from the group consisting of monochloroethane, monochloroethylene, 1,2-dichloroethylene, chlorobenzene, ethylene iodide and ethylene bormide.

17. A magnetic recording medium as claimed in claim 14, wherein said ketones are selected from the group consisting of methyl ethyl ketone, diethyl ketone, methyl vinyl ketone and methyl isopropenyl ketone.

18. A magnetic recording medium as claimed in claim 14, wherein said esters are selected from the group consisting of methyl acrylate, methyl methacrylate, vinyl acrylate and vinyl methacrylate.

19. A magnetic recording medium as claimed in claim 14, wherein said fluorohydrocarbons are selected from the group consisting of tetrafluoroethylene, perfluorocyclobutane and perfluorobenzene.

20. A magnetic recording medium as claimed in claim 14, wherein said silicon-containing organic compounds are selected from the group consisting of tetramethyl silane, hexamethyl disilazine, tetravinyl silane and tetramethyl disilaxane.

21. A magnetic recording medium as claimed in claim 5, wherein said organic material is selected from the group consisting of plamitic acid, stearic acid, oleic acid, linoleic acid, linolenic acid and a lithium, sodium or potassium salt thereof.

22. A magnetic recording medium comprising a magnetic layer of a ferromagnetic material, a layer of an organic material and a layer of carbon which are formed on a substrate in this order, wherein said layer of organic material has a thickness of 0.001 to 0.5 $\mu$m and a bond strength of at least 10 Kg/cm$^2$, and wherein said layer of carbon is formed by any one method of sputtering a target material comprised of carbon; decomposing a hydrocarbon-containing gas in a plasma for deposition; ionization deposition wherein carbon is evaporated in a vacuum vessel, and the resultant vapor particles are ionized and accelerated in an electric field to impinge on the surface of the substrate to be treated; or evaporating carbon while irradiating the surface of the substrate to be treated with an energy beam such as an ion beam, laser, and electron rays.

* * * * *